(12) United States Patent
Jones et al.

(10) Patent No.: US 7,245,721 B1
(45) Date of Patent: Jul. 17, 2007

(54) DATA ENCODING/DECODING DEVICE AND APPARATUS USING THE SAME

(75) Inventors: Clive Jones, Huntingdon (GB); Richard Hollinshead, Conyers (GB)

(73) Assignee: Meridian Audio Ltd., Huntingdon (GB)

( * ) Notice: Subject to any disclaimer, the term of this patent is extended or adjusted under 35 U.S.C. 154(b) by 0 days.

(21) Appl. No.: 09/913,785

(22) PCT Filed: Feb. 11, 2000

(86) PCT No.: PCT/GB00/00447

§ 371 (c)(1),
(2), (4) Date: Jan. 4, 2001

(87) PCT Pub. No.: WO85/04298

PCT Pub. Date: Sep. 26, 1985

(30) Foreign Application Priority Data

Feb. 19, 1999 (GB) ................................. 9903900.0

(51) Int. Cl.
*H04N 7/167* (2006.01)
(52) U.S. Cl. .................... 380/237; 380/28; 380/46; 704/500
(58) Field of Classification Search ................. 713/200
See application file for complete search history.

(56) References Cited

U.S. PATENT DOCUMENTS

| 4,663,500 | A | | 5/1987 | Okamoto ..................... 380/47 |
|---|---|---|---|---|
| 4,672,605 | A | * | 6/1987 | Hustig et al. ................ 370/201 |
| 4,893,339 | A | * | 1/1990 | Bright et al. .................. 380/28 |
| 5,613,005 | A | | 3/1997 | Murakami .................... 380/28 |
| 5,768,426 | A | * | 6/1998 | Rhoads ........................ 382/232 |
| 5,946,355 | A | * | 8/1999 | Baker ........................... 375/286 |

FOREIGN PATENT DOCUMENTS

| EP | 0 278 170 | 8/1988 |
|---|---|---|
| EP | 0 666 663 | 8/1995 |
| GB | 2 003 705 | 3/1979 |
| GB | 2 180 725 | 4/1987 |
| WO | WO 85/00259 | 1/1985 |
| WO | WO 85/04298 | 9/1985 |
| WO | WO 94/22236 | 9/1994 |
| WO | WO 96/27191 | 9/1996 |

* cited by examiner

*Primary Examiner*—Nasser Moazzami
*Assistant Examiner*—Brandon Hoffman
(74) *Attorney, Agent, or Firm*—Barnes & Thornburg, LLP

(57) ABSTRACT

A data encoding device has a serial data input and an encoded serial data output. The serial input is supplied to an encoding unit which combines each input bit with a plurality of additional encoding bits, to derive an encoded output bit and a plurality of updated encoding bits. The function performed by the encoding unit is selected such that over time the encoded output bit stream comprises substantially white noise. The output has constant and flat frequency response, so that the output of the encoding device is merely noise in the absence of an appropriate decoding device.

5 Claims, 3 Drawing Sheets

DATA ENCODING/DECODING DEVICE AND APPARATUS USING THE SAME

This invention relates to data encoding and decoding devices, particularly for serial digital data. This data may in one particular example be for transmission between different parts of an audio data processing system.

Currently, the output of audio or video reproduction equipment comprises a collection of data, formatted in accordance with the prescribed interface protocol. There is, however, a desire for digital output signals from such equipment to be encoded so that these output signals cannot be digitally recorded, for example to duplicate information stored on a CD or CD-ROM. This invention is concerned with the encoding of data particularly at the interfaces between audio or video data processing equipment.

This invention is applicable to digital serial data, irrespective of the original signal represented by the digital data. However, a further problem arises specifically in connection with digital audio data and the particular data formats currently used for transmitting such data between audio equipment.

Two similar standards have achieved widespread recognition and use for the encoding of digital audio data—the Sony Philips Data Interface Format ("SPDIF") and the Audio Engineering Society/European Broadcasting Union format ("AES/EBU"). The SPDIF format is most often used in products directed to the consumer market, whereas the AES/EBU format is most often used in equipment for professional applications.

Both of these standards use a biphase-mark encoded data stream to transmit digital audio information in serial format. In this biphase-mark encoding, each bit of data always starts with a transition of the signal and ends with a transition of the signal. If a transition occurs in the middle of the period, a one is encoded, otherwise a zero is encoded.

The use of biphase-mark encoding has several well-known advantages, the most important of which for this application is that biphase-mark encoding is self-clocking. Thus, as every bit starts and ends with a transition, the biphase-mark encoded data can be used to generate or recover a clock signal for use with the data. Therefore, apparatus receiving the encoded data in SPDIF or AES/EBU format does not require a local clock, but can instead derive the clock signal from the received encoded data.

A problem with the reconstruction of a clock signal from a received encoded input is that digital to analogue converters used in audio equipment require spectrally pure clock signals in order to operate satisfactorily at high resolution. The purity of the clock signal derived from the encoded data is worsened by the transmission of the data signal, for example over a coaxial cable. However, the effect of this transmission on the clock signal is reduced if the encoded data carrying the clock signal has a flat frequency spectrum.

According to the present invention there is provided a data encoding device having a serial data input and an encoded serial data output, wherein the serial input is supplied to an encoding unit which combines each input bit with a plurality of additional encoding bits, to derive an encoded output bit and a plurality of updated encoding bits, the function performed by the encoding unit being selected such that over time the encoded output bit stream comprises substantially white noise.

Thus, the invention provides an encoding device in which the encoding unit is arranged to provide additional bits which operate on the input data to provide an output having constant and flat frequency response. Thus, the output of the encoding device is merely noise in the absence of an appropriate decoding device. Furthermore, the transmission of noise as the output of the encoding device enables a clock signal which is to be recovered from the data signal to be transmitted with minimum deterioration. This applies regardless of the type of data being transmitted, but for audio data the recovery of a spectrally pure clock signal is particularly desirable.

The additional encoding bits may initially be derived from a random number generator to enable initialization of the encoding device. The introduction of a random element increases the entropy of the encoding device.

It is of course necessary for information concerning the random element used in the encoding operation to be transmitted with the encoded data to enable subsequent decoding. A problem then arises that this information occupies bandwidth of the transmission channel. A large number of encoding bits is desired to improve the security of the encryption, whereas it may only be possible to provide a small number of bits relating to the random number in the available bandwidth of the transmission channel allocated to this type of control data.

This random number is preferably therefore encoded internally using a transformation unit which expands the random number. Preferably, the serial input comprises a string of digital words each comprising a predetermined number of bits, and wherein the random number generator is clocked using a word clock, such that for each digital word of the input a new random number bit is generated. The transformation unit then comprises means for storing a predetermined number of previous values of the one bit random number to derive a multiple bit random word.

A permutation unit is preferably provided to operate on the multiple bit random word, to generate as output the additional encoding bits, the permutation unit having a function such that the latching operation of the transformation unit cannot be derived from the additional encoding bits.

The random number is preferably encoded using a further transformation unit, with the transformed random number being provided as an output of the data encoding device. This enables the transformed random number to be provided to an associated decoding device to enable reconstruction of the original data.

The encoding unit is preferably re-initialized by output of the permutation unit once for each word. This arrangement enables the encoding device to re-initialize itself after each word. For audio applications, a word typically comprises two data samples, one for each stereo output. This arrangement enables a system having an encoding device and a decoding device to regain communication with minimum of delay in the event of a failed transmission between the two devices. Also, the encryption or scrambling performed by the encoding device may be turned on or off with minimum disruption.

The encoding device preferably is arranged such that the encoded output bit represents the input bit with zero bit delay.

The invention also provides an apparatus for generating digital audio data comprising a source of digital audio signals, a data encoding device of the invention and a transmitter for supplying the encoded serial data output to an output port of the apparatus. This apparatus may comprise a compact disc player. The serial data output preferably comprises digital audio data which may be arranged in the SPDIF or AES/EBU format.

The invention also provides a data decoding device for decoding a serial data stream encoded by an encoding device of the invention. This decoding device may be used in an apparatus for reconstructing digital audio signals, such as a speaker.

According to a second aspect of the invention, there is provided an apparatus for encoding digital audio signals, the apparatus having an audio input in a format having a dedicated clock signal channel and an encoded audio output in a format having an intrinsically defined clock signal in the output data stream, wherein the audio input is encoded such that the encoded audio output comprises substantially white noise, and the output of the apparatus additionally comprises control data for enabling the audio input to be reconstructed at an associated decoding device.

This apparatus can increase the security of data transmission, whilst additionally providing the advantage of improved recovery of the clock signal which is recovered from the encoded signal.

The output format having an intrinsically defined clock signal may use biphase-marking, for example the SPDIF or AES/EBU data format. In this case, the control data may be carried on (at least) the U channel. This is particularly desirable, since conventional recording equipment operating according to these formats does not record the U channel, so that the security of the encryption is enhanced. The format having a separate clock channel may comprise the I$^2$C data format.

The invention will now be described by way of example, with reference to the accompanying drawings, in which.

Figure 1:
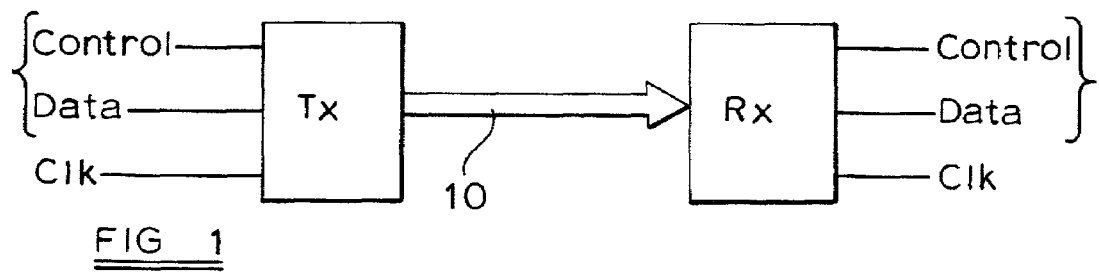
FIG. 1 shows a conventional serial data transmission.

A conventional data transmission system, for transferring data between data processing apparatus is shown in FIG. 1. As an example, the transmitting apparatus Tx of FIG. 1 may be within a compact disc player, and the receiving apparatus Rx may be within a loud speaker. In this case, the data to be transferred comprises audio data, and the specific example described below is an audio application of the invention, although the invention is not limited to audio data.

In order to control the transmission of data, the transmission circuit Tx is provided with control data as well as the data to be transmitted, and additionally a clock signal CLK which provides the timing information.

Two similar standards are now widespread for the encoding of digital audio data, the Sony Philips Data Interface Format ("SPDIF") and the Audio Engineering Society/European Broadcasting Union standard ("AES/EBU"). These standards both use a biphase-mark encoded data stream to transmit digital audio information in serial format. This biphase-mark encoding is well known in the art and will not be described in detail. However, it is worthy of note that this encoding technique is self-clocking, so that the clock signal which governs the control of the transmission circuit is effectively recoverable by the receiver from the encoded data stream itself, so that the receiver does not need an independent synchronized clock.

Figure 2:
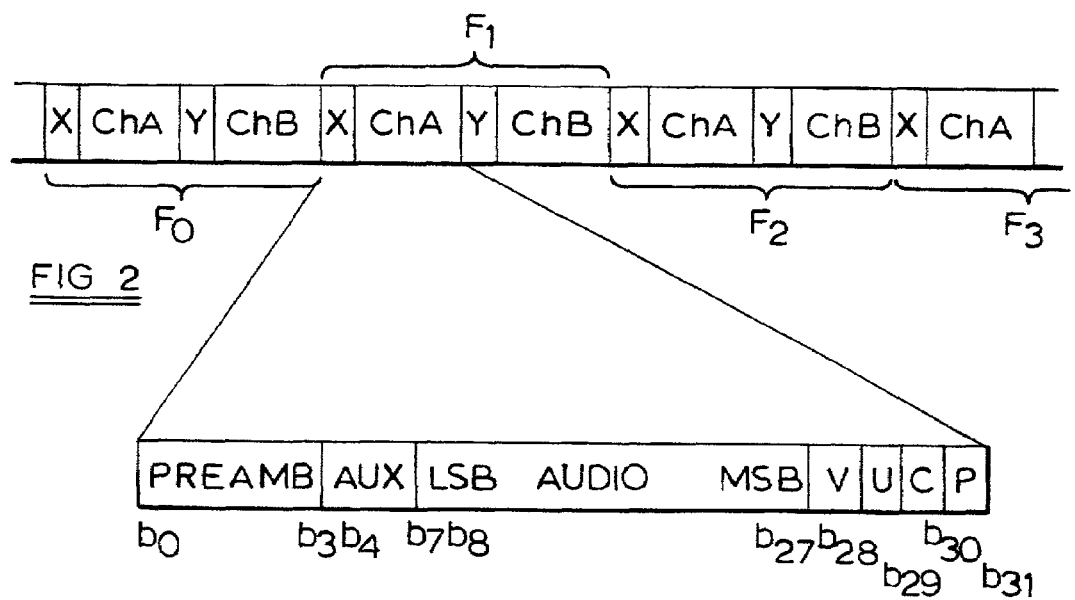
FIG. 2 shows the frame structure of SPDIF or AES/EBU data and the structure of individual sub-frames.

The SPDIF and AES/EBU standards also define the manner in which data is defined into frames and sub-frames. FIG. 2 shows the frame format used in the SPDIF and AES/EBU standards. Within each frame $F_0$, $F_1$, $F_2$ ..., two channels of audio data are transmitted, namely channels A and B, ChA, ChB. The beginning of each channel A and B is identified by the preambles X and Y, respectively.

A frame comprises a single sample of the audio data for channel A and channel B, together with associated preambles X and Y and any auxiliary data or non-audio data bits. Each frame F thus comprises two sub-frames, one for each channel. One such sub-frame is shown in FIG. 2 in expanded form, and comprises the audio data AUDIO for the respective channel, together with the associated preamble PREAMB and any auxiliary data AUX and additional non-audio data bits V, U, C, P. Thus, as shown in FIG. 2, bit positions $b_0$ to $b_{31}$ make up the sub-frame. The preamble PREAMB occupies bit positions $b_0$ to $b_3$, and auxiliary data AUX which occupies bit positions $b_4$ to $b_7$ may either provide non-audio information or may be used as part of the audio data. This audio data occupies bit positions $b_8$ to $b_{27}$, and together with the available auxiliary data a 24 bit sample for each channel may be provided. Four additional bits of non-audio data are also included comprising a validity bit V, to indicate whether the data within the sub-frame is suitable for conversion to analogue, a user data bit U which can be used for any purpose, a channel status bit C and a parity bit P.

As will be known to those skilled in the art, the preambles X, Y may each begin with a digital pulse that is 1.5 times the sample time in duration. This is a violation of the biphase-mark encoding rule that each cell is bordered by a transition. Thus, each preamble begins with a code violation to distinguish the preamble from any other event in the data stream.

To the extent described above, the SPDIF and AES/EBU standards are identical. The difference between these two standards is that the use of the user data and channel status data bits differ.

As described above, biphase-mark encoding provides a self-clocking digital signal. Conventionally, a phase-locked loop is used to recover a clock signal from the data signal transmitted. In such a device, a digital edge-triggered phase detector is coupled to a voltage-controlled oscillator. Through a feedback loop, the VCO is used to generate an independent clock signal having a frequency design to match the clocking of the incoming biphase-mark encoded signal. Alternatively, a clock signal may be based on the amount of time that passes between the preamble signals, although in the encoding scheme of this invention a clock cycling at the transmission rate of individual bits is required, as will be described in the following.

There is increasingly a desire to provide a level of security for the data transmitted between different equipment within a data processing system. For example, in the conventional data transmission system represented in FIG. 1, the data 10 transmitted over the serial coaxial cable may simply be recorded with digital recording equipment so that copies of the original data source may be generated. To prevent unauthorized copying, there is a requirement for data transmitted between different pieces of equipment (for example compact disc players and speakers) to be provided in encoded format.

Furthermore, a problem with the use of a self-clocking digital interface is that the recovered clock will exhibit "jitter" correlated to the data on the interface. In many applications, the accuracy and spectral purity of the clock that can be recovered by the receiver Rx is important, and the recovery of the clock will be more accurate the more closely the data on the interface approximates a random bit stream.

Figure 3:
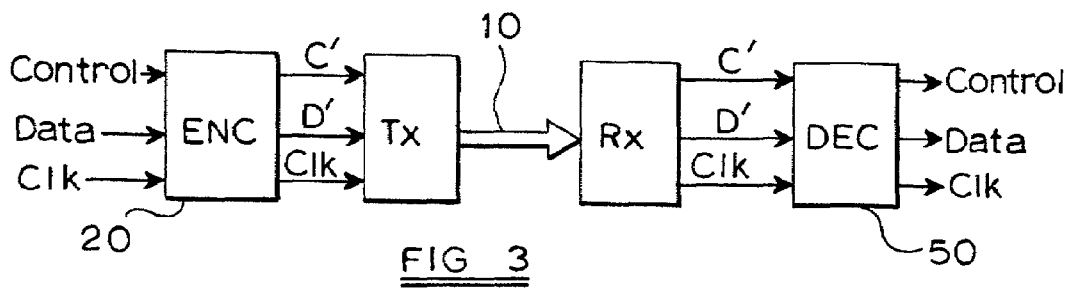
FIG. 3 shows a data transmission system using decoding and encoding in accordance with the invention.

FIG. 3 shows in schematic form an encoding technique according to the invention, in which an encoder 20 is interposed between the original data source and the transmitter Tx, and a decoder 50 is interposed between the transmitter Rx and the output. The encoder and decoder still enable the conventional standardized transmitter Tx and receiver Rx to be utilized, for example which may operate according to the SPDIF or AES/EBU format. In accordance with the invention, the effect of the encoder 20 is to encode at least the audio data from the input so that the encoded output D' comprises substantially white noise, and wherein encoded control data C' is provided to enable the audio input data to be reconstructed at the decoding device 50. By providing an encoding scheme which gives a data output D' comprising substantially white noise, the recovery of the clock signal is greatly improved which particularly assists in subsequent digital to analogue conversion.

Furthermore, the security of the transmission is also improved.

The functions performed by the encoding device 20 and the decoding device 50 may be standardized for all equipment, so that the relationship between the data 10 and the input data is known. However, it is preferred that the conversion of the data also effects scrambling of the data, so that the exact construction of the encoder 20 and decoder 50 are kept secret and must be known in order to derive any useful information from the data 10. In this case, the functions of clock recovery improvement and of data scrambling are combined, so that these functions may be performed in a single piece of apparatus. A preferred scrambling technique according to the invention will now be described in greater detail.

Figure 4:
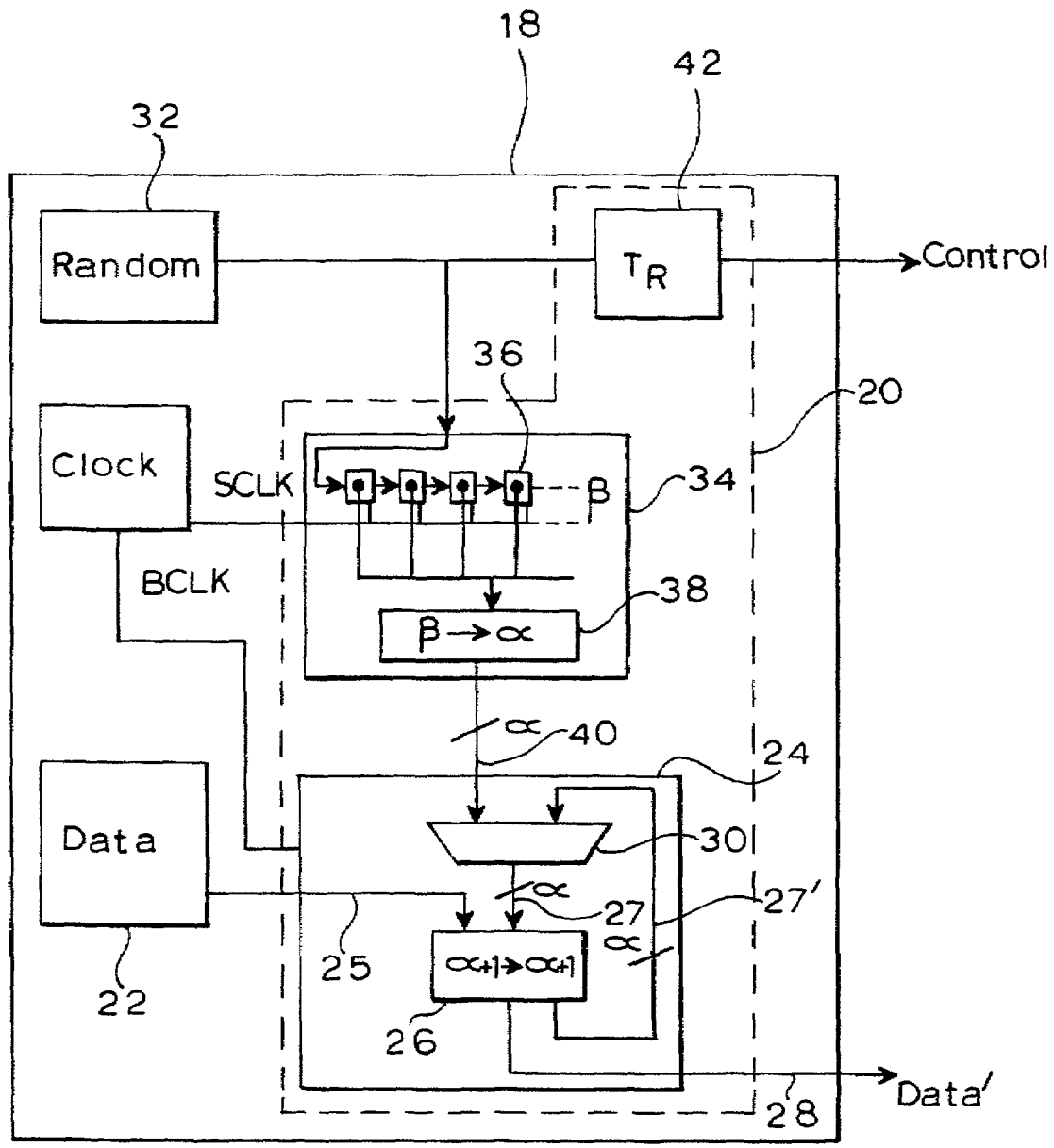
FIG. 4 shows in greater detail an encoding unit of the invention.

FIG. 4 shows an apparatus 18 for generating encoded data DATA' which includes an encoder 20 as represented schematically in FIG. 3.

The encoder 20 receives a digital signal from a data source 22, for example a compact disc reader for audio or video data. The data from the data source 22 is provided to an encoding unit 24 which provides the encoded data DATA'. The data from source 22 can include the conventional control data so that the output data DATA' includes part of the encoded control data C' shown in FIG. 3.

The encoding unit 24 receives the input data as a serial data bit stream 25 and which is provided to a combinatorial unit 26. This unit 26 combines each input bit from the bit stream 25 with an additional number α of encoding bits 27 so as to generate an encoded data output bit 28 and an updated set 27' of the α encoding bits. These updated encoding bits 27' are supplied by a feedback path through a latch mechanism (not shown) to a multiplexer 30. The multiplexer 30 normally passes these updated encoding bits 27' to the combinatorial unit 26 for processing of the subsequent bit of the data bit stream 25. The operation of the multiplexer 30 will be described in greater detail in the following.

The purpose of the combinatorial unit 26 is to provide an output data bit stream DATA' which has the spectral response of substantially white noise, namely a substantially flat spectral response over the frequency range of interest. To achieve this, the input data from the bit stream 25 may be combined with a known function of the encoding bits 27 using an XOR function. Thus:

$$\text{DATA}'=\text{DATA} \oplus f(EB), \text{ where EB are the encoding bits } 27.$$

This function may be implemented simply as a look-up table, which also provides the updated encoding bits 27' as a function of the data input and the current encoding bits. Thus:

$$EB'=g(\text{DATA}, EB), \text{ where EB' are the updated encoding bits } 27'.$$

The updating of the encoding bits is carried out once for each new bit from the input bit stream 25, so that the encoding unit 24 requires a bit clock signal BCLK which is shown only schematically in FIG. 4 as being supplied to the unit 24. The exact arrangement of latching and sequencing elements required in the encoding unit 24 will not be described, since these will be apparent to those skilled in the art.

The operation of the encoding unit is therefore essentially to encrypt each input bit with a string of bits forming an encryption key, and wherein each subsequent input bit is encrypted using a modified key which is derived from previous values of the key and of the input bit.

The design of the encoding unit 24 described above enables the encoded output data to have the properties of white noise, but the data structure is preserved, so that conventional standardized interface protocols may be employed. Furthermore, the feedback of encoding bits described can enable the encoded output data DATA' to be generated with 0 bit delay since the look-up table or other functional unit which constitutes the combinatorial unit 26 may be addressed in a shorter time period than the time associated with the reception of each individual bit from the data bit stream 25.

The zero bit delay of the encoding unit 24 enables the encryption to be switched on and off if desired, with minimum of delay.

When the operation of the apparatus 18 is started, there will be no updated encoding bits 27' to enable the encoding unit 24 to operate in a predictable manner. Consequently, a set of encoding bits must be provided for initialization of the encoder 20. An encoded random number is employed for this purpose. Thus, the apparatus 18 includes a random number generator 32 which provides a random or quasi-random output bit stream. As one example, the random number generator comprises a pseudo-random number generator with a cycle of many thousand iterations, and a source of unpredictable (but not white) data. These may be combined to give a white and unpredictable data source. The source of unpredictable data may be derived from data in another device of the apparatus (for example a microcontroller) performing unrelated functions, and preferably with different clocking, or may be derived from some other unrelated parameter. The pseudo-random number generator may comprise part of the encoder 20 (although this is not shown) so that the output can not be easily obtained.

The initialization encoding bits must be conveyed to a decoding device of the system to which the encoded information is transmitted. However, the bandwidth available for the transmission of this type of control data may not be sufficient to provide an appropriate number of bits for the encoding unit 24. For example, in the case of SPDIF the signal derived from the random bit stream may be provided on the U channel of the data structure (as explained in the following), which provides only one bit per channel sample, as shown in FIG. 2.

For this reason, a new random (or quasi-random) bit is generated only once for each input word. The random or quasi random output bit stream is supplied to a transformation unit 34 comprising a serial array of latches 36 which effectively store a number of bits from the previous history of the random number generator 32, so that a larger random word, suitable for generating the initialization encoding bits, may be generated.

The array of latches comprises a number β of latches 36, and these latches are triggered with a sample clock signal SCLK. For example, if the data to be encoded comprises two 24 bit words of digital audio data, the sample clock SCLK will have a frequency 48 times lower than the bit clock BCLK. A new random number is therefore stored in the array of latches 36 for each digital word, although all but one of the bits of the random word will be in common with the previous random word.

In order to disguise the dependence of each random word on the previous random words, a permutation function may be performed on the random word (having β bits) in a permutation unit 38, which provides an output having a number α of bits corresponding to the required number of encoding bits in the encoding unit 24. The relationship between the output 40 and the history of the random number generator is thus not obvious to a third party. This output 40 is supplied to the encoding unit 24 as shown in FIG. 4.

In a preferred example, at the beginning of each word of the input, the output 40 of the transformation unit is used to provide the first set of encoding bits 27 within the encoding unit 24. Subsequently, the feedback loop generates the updated encoding bits 27' for the subsequent encoding operation.

If the number α of initialization bits is sufficiently large, the re-keying of the encoding scheme every word ensures that the function of the combinatorial unit 26 can not be determined by any simple inspection, as explained below.

The unit 26 has $2^\alpha$ internal states, so that a full interrogation of the effect of each internal state could be determined by studying the output of the unit 26 for $2^\alpha$ cycles, once for a constant input 25 of 1 and once for a constant input 25 of 0. Therefore, the number α of encoding bits is preferably selected such that $2^{\alpha+1}$ is greater than the number of bits in each word, so that the encoding unit 24 is re-keyed before a full interrogation can be performed. To provide the suitable number of encoding bits, the latch arrangement in the unit 34 is required, effectively to expand the random bit stream by storing previous values.

The arrangement described enables reception to be recovered after an interruption in the data signal with a maximum delay of one word. If the transmission of control data is interrupted, the correct control information for resumption of the transmission can be obtained after β words, since this enables the data in the full latch arrangement 34 to have been transmitted subsequently to the interruption.

To decode the encoded data stream, the function of the encoding unit 24 must be reversed, and additionally the initial encoding bits 27 used by the encoding unit 24 must be known. For this purpose, the random number produced by the random number generator 32 is also provided as an output of the apparatus 18, although this random series of bits is also provided through a transformation unit 42 to provide additional security. In a preferred example in which the data comprises digital audio data, and in which the output of the apparatus 18 is to be converted into in SPDIF or AES/EBU format, the encoded data DATA' may occupy the auxiliary and audio segments of each channel, as represented in FIG. 2, whereas the transformed random number (i.e. the control data indicated in FIG. 4) may occupy the U channel also represented in FIG. 2, and optionally one or more other non-audio bits. For audio data to be formatted in accordance with these standards, this arrangement is preferred, as conventional digital audio recording equipment having an input in standardized SPDIF or AES/EBU format does not record the non-audio channels within the frame structure. Also, any corruption of the U channel (or other chosen channel), for example incorrect synchronisation, will prevent correct decoding.

An optional additional function performed by the encoding unit 20 is to set the validity bit V to a value which indicates that D/A conversion of the data conveyed is not appropriate. In the SPDIF format, the validity bit V is used as a flag for this purpose. The effect of this is to disable conventional decoders so that no output is produced by the decoder of a conventional receiver. If the data is nevertheless decoded in a standard receiver, the output will comprise white noise.

One operation which may be performed by the unit 42 is to provide on one non-audio channel (e.g. the U channel) a signal which has a transition for each rising edge of the input signal, and to provide on another non-audio channel (e.g. the V channel) a signal which has a transition for each falling edge of the input signal. Of course, numerous other encoding schemes may be employed to enable the random string of data bits to be provided on the non-audio channels in an encoded manner.

The encoding operation described above may be performed purely on the user data stored within the channel frame structure, or may also be performed on the control data of the channel. Thus, although in FIG. 3 the encoder and decoder are shown to operate on the control and user data, the control information may in fact bypass the encoding circuitry, although additional control data is derived from the random number generator. It may be possible for this additional control data may to replace data in the existing defined frame structure. The data and control data may together comprise an I²S digital audio stream.

The output of the apparatus 18 shown in FIG. 4 is provided to a conventional transmitting circuit Tx which reconfigures the data to satisfy the standard interface protocol. Thus, in the example of digital audio data, the encoded data stream DATA', the necessary control data (if not included in DATA') and the additional control signal derived from the random number is formatted into the frame structure illustrated in FIG. 2. This data format may be transmitted over a conventional coaxial cable between different pieces of equipment within a data processing apparatus.

As alternatives to the example of a CD player given above, the apparatus 18 may comprise a digital radio, TV or satellite receiver, DVD payer, surround sound decoder, multiroom distribution system or any other signal processing unit. The transmission may be wired or wireless.

Figure 5:
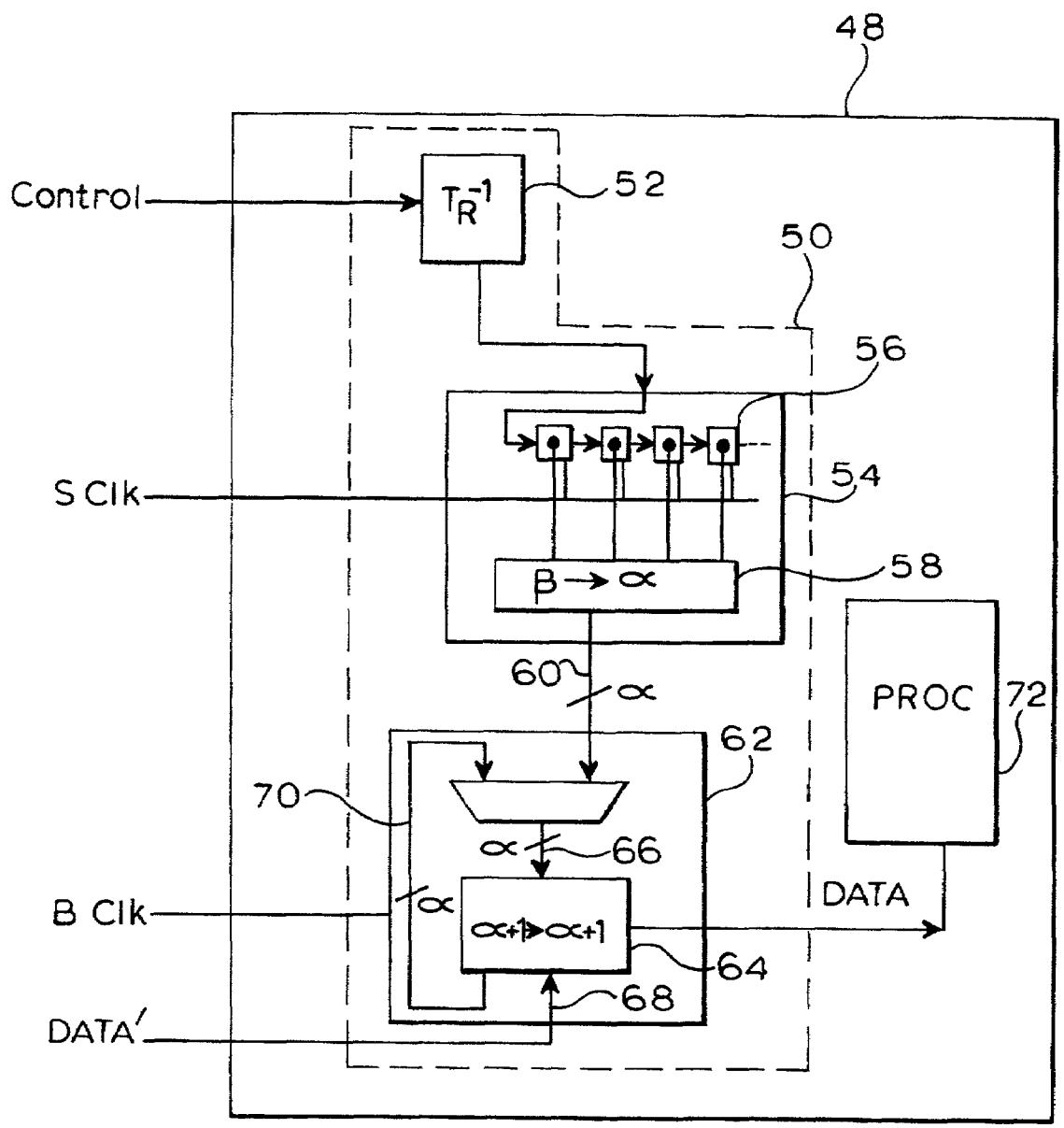
FIG. 5 shows in greater detail a decoding unit of the invention.

FIG. 5 shows the architecture of a decoder for receiving the transmitted information and reconstructing the original data.

The decoder 50 essentially comprises units having the inverse functions of the encoder 20 described with reference to FIG. 4. Thus, the decoder 50 comprises an inverse transform unit 52 which can recover the random number coded in the control signal, and preferably transmitted over the non-audio channels (in the case of digital audio data transmission). Since this random number is used in the encoding unit to derive the initialization values for the encoding unit 24 in the encoder 20, the same initialization values must be recovered in order to enable the decoding process to function. A transformation unit 54 having the same structure to the unit 34 of the encoder is provided to recover the number a of initialization values used in the encoder at the beginning of each data word. The transformation unit 54 comprises the sequence of latches 56 and the permutation unit 58 corresponding to those units in the encoder 20. The latches 56 are again triggered by a sample clock SCLK. The clock signals used to control the decoder 50 are recovered from the transmitted data by the receiver Rx in conventional manner. The initialization values which form the output 60 of the inverse transformation unit 54 are supplied to a decoder unit 62 which performs the inverse function to that carried out in the encoder unit 24, For this purpose, a combinatorial unit 64 is provided which enables the original data signal DATA to be reconstructed from a set of decoding bits 66 and the encoded data input 68. In the same way as for the encoding unit 24, the decoding bits 66 are obtained from the output of the inverse transformation unit 54 at the beginning of each word, but are obtained by a feedback path 70 after initialization.

The decoded data output DATA is supplied to a processor 72 which carries out the normal function of the apparatus 48. The apparatus 48 shown in FIG. 5 may comprise, as alternatives to the example given above of a loudspeaker, a surround sound decoder, graphic equaliser, multiroom distribution system, D to A converter, power amplifier, video display device, graphics processing device or any other signal processing device receiving a serial digital input.

One particular encoding scheme has been described above in detail, although no details have been given of the exact scrambling functions that may be employed. However, the various possibilities will be apparent to those skilled in the art. Furthermore, the exact number $\alpha$ of bits used as the encoding or decoding bits in the encoding unit 24 or the decoding unit 62 may be any suitable value. A higher number $\alpha$ will enable the whiteness of the encoded data output DATA' to be increased, but at the expense of greater processing requirements. As one example, number a may equal 16 so that the combinatorial units 26 and 64 perform a transformation function operating on a 17 bit word. The number of bits $\beta$ the random word does not need to be the same length so, for example, the transformation unit 38 may convert a 65 bit random word into the series of 16 initialization bits for the encoding unit 24.

The encoding technique described may be implemented in software in a general purpose CPU, in a DSP device, in a gate array IC, in an ASIC, in discrete logic on an a PCB or in some combination of these.

The invention claimed is:

1. An apparatus for generating digital audio data comprising
    a source of digital audio signals, and
    a data encoding device having:
    a serial data input;
    an encoded serial data output;
    a random number generator which generates a stream of random bits;
    a transformation unit comprising means for storing a predetermined number of values of the random bit to derive a multiple bit random word;
    a permutation unit which generates an initial plurality of encoding bits from the multiple bit random word; and
    an encoding unit which combines each bit input on the serial data input with a plurality of additional encoding bits forming an encryption key, to derive an encoded output bit and an updated encryption key comprising a plurality of updated encodes bits, wherein an initial bit input on the serial data input is encoded with an encryption key comprising the initial plurality of encoding bits output by the permutation unit and each subsequent input bit is encrypted using an updated key which is derived from previous values of the encryption key and of the input bit, and wherein over time the encoded output bit stream comprises substantially white noise.

2. An apparatus as claimed in claim 1, wherein the output at the output port is in SPDIF or AES/EBU format.

3. An apparatus as claimed in claim 1, comprising a compact disc player.

4. An apparatus for reconstructing digital audio signals comprising:
    an input for receiving encoded digital audio signals;
    a receiver for supplying the encoded digital audio signals to a decoding device;
    and an output for the reconstructed digital audio signal; and
    a decoding device comprising:
    a serial data input;
    a transformation unit comprising means for storing a predetermined number of values of random bits to derive a multiple bit random word;
    a permutation unit which generates an initial plurality of bits from the multiple bit random word; and
    an decoding unit which combines each bit input on the serial data input with a plurality of additional encoding bits forming a key, to derive an decoded output bit and an updated key comprising a plurality of updated bits, wherein an initial bit input on the serial data input is decoded with a key comprising the initial plurality of bits output by the permutation unit and each subsequent input bit is decrypted using an updated key which is derived from previous values of the key and of the input bit.

5. A data communications system comprising:
    a data encoding device comprising:
    a serial data input;
    an encoded serial data output;
    a random number generator which generates a stream of random bits;
    a transformation unit comprising means for storing a predetermined number of values of the random bit to derive a multiple bit random word;
    a permutation unit which generates an initial plurality of encoding bits from the multiple bit random word; and
    an encoding unit which combines each bit input on the serial data input with a plurality of additional encoding bits forming an encryption key, to derive an encoded output bit and an updated encryption key comprising a plurality of updated encodes bits, wherein an initial bit input on the serial data input is encoded with an encryption key comprising the initial plurality of encoding bits output by the permutation unit and each subsequent input bit is encrypted using an updated key which is derived from previous values of the key and of the input bit, and wherein over time the encoded output bit stream comprises substantially white noise; and
    a decoding device comprising:
    a serial data input;
    a transformation unit comprising means for storing a predetermined number of values of random bits to derive a multiple bit random word;
    a permutation unit which generates an initial plurality of bits from the multiple bit random word; and
    an decoding unit which combines each bit input on the serial data input with a plurality of additional encoding bits forming a key, to derive an decoded output bit and an updated key comprising a plurality of updated bits, wherein an initial bit input on the serial data input is decoded with a key comprising the initial plurality of bits output by the permutation unit and each subsequent input bit is decrypted using an updated key which is derived from previous values of the key and of the input bit.

* * * * *